United States Patent [19]

Miyao

[11] Patent Number: 4,737,674
[45] Date of Patent: Apr. 12, 1988

[54] SINGLE PHASE BRUSHLESS MOTOR WITH A CORE

[75] Inventor: Osami Miyao, Kanagawa, Japan

[73] Assignee: Shicoh Engineering Co., Ltd., Kanagawa, Japan

[21] Appl. No.: 919,990

[22] Filed: Oct. 17, 1986

[51] Int. Cl.[4] .................. H02K 37/00; H02K 29/08
[52] U.S. Cl. .................................. 310/268; 310/156; 318/254
[58] Field of Search ............... 310/68 R, 68 B, 156, 310/268, 67 R; 318/138, 254

[56] References Cited

U.S. PATENT DOCUMENTS

| 4,072,881 | 2/1978 | Ban | 310/156 |
| 4,217,508 | 8/1980 | Uzuka | 310/46 |
| 4,494,028 | 1/1985 | Brown | 310/156 |
| 4,499,420 | 2/1985 | Shiraki et al. | 310/156 |

FOREIGN PATENT DOCUMENTS

| 247546 | 7/1985 | Japan | 310/156 |
| 59-77277 | 11/1985 | Japan | 310/156 |

Primary Examiner—Patrick R. Salce
Assistant Examiner—D. L. Rebsch
Attorney, Agent, or Firm—Wegner & Bretschneider

[57] ABSTRACT

A cored single-phase brushless motor including a single position-detecting element can start itself without provision of a special cogging generating means. A field magnet as a rotor of the motor has alternate north and south magnetic pole zones, one of which has a width equal to an electrical angle of about 120 degrees while the other has a width equal to an electrical angle of about 240 degrees. A stator armature core has stator poles formed in a circumferentially equidistantly spaced relationship thereon and having a width equal to an electrical angle of about 120 degrees, and armature coils are wound on the stator poles. A position-detecting magnet rotor is formed on the field magnet, and a magnetic sensor detects a north, south magnetic pole or non-magnetized zone of the magnet rotor, to detect the position of the field magnet. An electric current successively energizes, in response to signals from the magnetic sensor, the armature coils for an electrical angle of 120 degrees to rotate the rotor.

5 Claims, 6 Drawing Sheets

FIG. 16

SINGLE PHASE BRUSHLESS MOTOR WITH A CORE

BACKGROUND OF THE INVENTION

1. Field of the Invention

This invention relates to a single-phase brushless motor which is well adapted for a spindle motor for a floppy disk drive, a motor for audio and video appliances, and a DC brushless axial-flow fan motor.

2. Description of the Prior Art

A brushless motor is used in a variety of appliances, owing to its advantages that it emits little noise and has a long life, because it has neither brush nor commutator, in addition to its characteristics as a DC motor.

In a brushless motor, an electronic circuit is used to switch energization of armature coils of the motor and includes a driving circuit which necessarily includes a number of position detecting elements (normally, magnetic sensors such as Hall effect elements and Hall ICs are used) corresponding to the number of applicable phases of the motor. Accordingly, it is a drawback that as the number of phases increases, the production cost increases accordingly, due to such position detecting elements.

Therefore, inexpensive appliances such as axial-flow fans commonly employ a single-phase brushless motor which includes a driving circuit designed for a single-phase and hence can be produced at a low cost.

Such a single-phase brushless motor has a drawback that it cannot start itself if it stops at a dead point.

Figure 1:
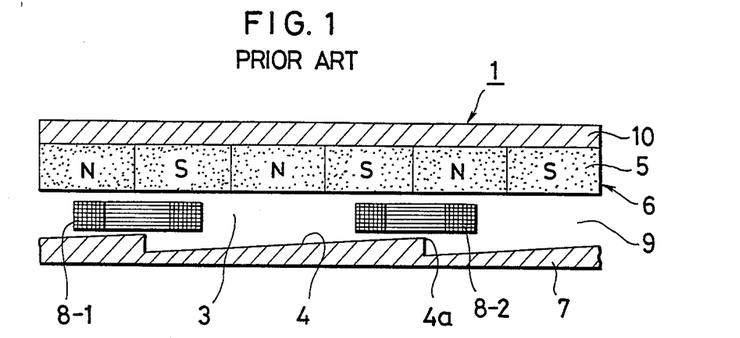
FIG. 1 is schematic illustration of a conventional single-phase brushless motor of a coreless structure wherein an air gap is sloped so as to generate a cogging torque to allow self-starting of the motor.
Figure 2:
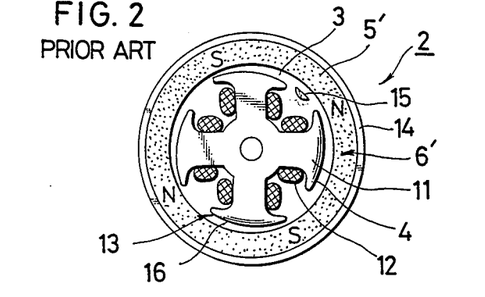
FIG. 2 is a schematic illustration of a conventional cored single-phase brushless motor wherein an air gap is sloped so as to generate a cogging torque to allow self-starting of the motor.

Therefore, a conventional single-phase brushless motor is normally provided with means for allowing self-starting of the motor. Referring to FIGS. 1 and 2, single-phase brushless motors including such means are shown and denoted at 1 and 2, respectively. The brushless motors 1, 2 each have an air gap 3 which is partially sloped as at 4 so as to cause a cogging torque to be generated, thereby to assure self-starting of a field magnet 6, 6' having driving magnetic pole zones 5, 5', respectively.

More particularly, FIG. 1 is a developed view of a flattened coreless single-phase brushless motor. Referring to FIG. 1, the field magnet 6 of the brushless motor 1 constitutes a rotor and has six such driving magnetic pole zones 5. The field magnet 6 is mounted for rotation relative to a stator armature 9 which includes a stator yoke 7 having such sloped faces 4 formed on a face thereof and a pair of coreless armature coils 8-1, 8-2 located at same phase positions on the face of the stator yoke 7.

In the single-phase brushless motor 1, when it is deenergized, it is normally stopped at a particular position in which a most projected end 4a of one of the slopes 4 formed on the stator yoke 7 is opposed to a mid-portion of one of N (north) or S (south) magnetic pole zones 5 of the field magnet 6.

Thus, if the armature coils 8-1, 8-2 are located so as to generate a torque in this condition and a magnetic sensor such as a Hall effect element or a Hall IC (integrated circuit) serving as a position detecting element (not shown) is located at any position other than boundary positions between adjacent N and S pole zones of the field magnet, that is, than dead points, the magnetic sensor will provide an output without fail when the brushless motor 1 is to start. Consequently, the armature coils 8-1, 8-2 will be energized in a predetermined direction from a driving circuit in response to such output signal from the magnetic sensor to start rotation of the motor 1 in a predetermined direction.

It is to be noted that reference numeral 10 in FIG. 1 denotes a rotor yoke for closing a magnetic path of the field magnet 6.

Such a flattened coreless single-phase brushless motor 1 has a drawback, in that it is troublesome that the slopes 4 must be formed on the stator yoke 7 and the thickness of the air gap 3 is relatively great due to the slopes 4, and hence a high turning torque cannot be obtained, resulting in low efficiency of the entire motor 1.

Meanwhile, FIG. 2 is an illustration of a 4-magnetic pole, 4-stator pole, 4-coil cored, i.e., with a core, single-phase brushless motor. The single-phase brushless motor 2 includes a stator armature core 13 having 4 radially extending stator poles 11 formed in a circumferentially equidistantly spaced relationship from each other and joined together at base end portions thereof. An armature coil 12 is wound on each of the stator poles 11 of the stator armature core 13.

The field magnet 6' is located in an opposing relationship to the stator armature core 13, with the radial air gap 3 left therebetween and is supported for rotation relative to the stator armature core 13.

In the single-phase brushless motor 2, slopes 16 are formed on the stator poles 11 of the stator armature core 13 to provide slopes to the air gap 3 in order to allow self-starting of the motor 2.

It is to be noted that in the single-phase brushless motor 2 the armature coils 12 are wound in bifilar windings such that two opposing ones of the armature coils 12 for a first phase may be energized with a polarity opposite to the polarity of the other opposing armature coils 12 for a second phase.

It is to be further noted that the single-phase brushless motor 2 is characterized in that stator poles 11 of the stator armature core 13 thereof are each sloped or slanted with respect to the rotor such that the dimension of the air gap gradually increases toward a clockwise direction. The motor 2 is thus relatively simple in construction (but still remains complicated because the slopes 16 must be formed), but it has a drawback that, because the dimension of the air gap must be relatively great, a high torque cannot be obtained and the efficiency of the motor is low.

Further, the single-phase brushless motors of FIGS. 1 and 2 which utilize a cogging torque have another drawback that smooth rotation cannot be attained because a high cogging torque is produced.

Figure 3:
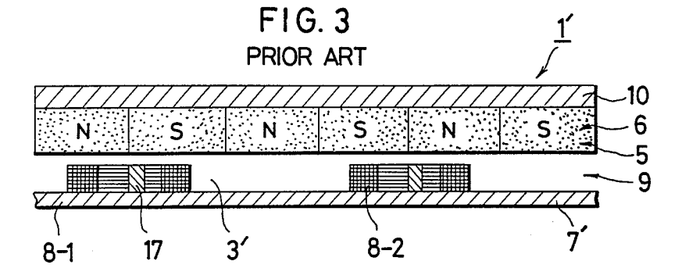
FIG. 3 is a view similar to FIG. 1 but showing a conventional single-phase brushless motor of a coreless structure wherein an iron bar is disposed in an air gap so as to generate a cogging torque to allow self-starting of the motor.

FIG. 3 is an illustration of another single-phase brushless motor wherein a relatively high torque can be obtained with a coreless structure by making an air gap uniform without a slope.

The single-phase brushless motor generally denoted at 1' here includes an iron bar 17 arranged in an air gap 3' in order to allow self-starting of the motor 1'.

Due to the presence of the iron bar 17, a field magnet 6 attracts the iron bar 17 and is thus moved to a position from which it can start itself. Accordingly, with a single position detecting element, the single-phase brushless motor 1' can start itself and rotate continuously.

Figure 4:
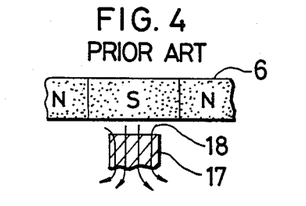
FIGS. 4 and 5 are schematic illustrations of part of the single-phase brushless motor of FIG. 3.
Figure 5:
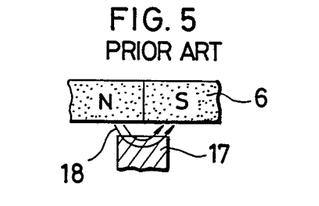

However, if the iron bar 17 is fattened to obtain a higher cogging torque to further assure self-starting of the single-phase brushless motor 1', when it opposes to an S or N pole zone of the field magnet 6, a magnetic flux 18 of the field magnet 6 will pass as illustrated in FIG. 4, but a magnetic flux 18 will pass as illustrated in FIG. 5 when the iron bar 17 is at a position opposing a boundary between adjacent N and S pole zones of the field magnet 6. Thus, sometimes the field magnet 6 may stop, upon deenergization of the motor 1', at such a position as seen in FIG. 5.

Thus, the single-phase brushless motor 1' has a drawback that if the field magnet 6 stops at such a specific position, energization of the armature coils 8-1, 8-2 will not start the motor 1'.

Single phase brushless motors are also known wherein a non-magnetized zone (or a substantially non-magnetized zone) is formed on a driving field magnet. Brushless motors of this type have a drawback that it is difficult and troublesome to form such a non-magnetized zone, which is not suitable for mass production of brushless motors of the type.

A single-phase brushless motor of the type is disclosed, for example, in U.S. Pat. No. 3,299,635 and is shown in FIG. 6.

Figure 6:
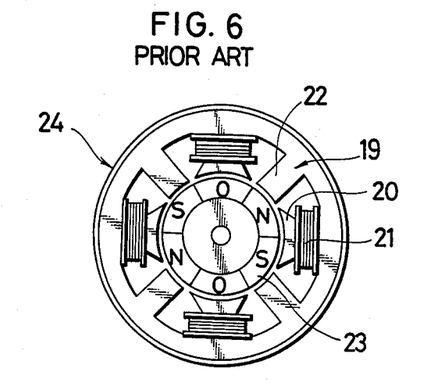
FIG. 6 is a schematic illustration of a conventional cored single-phase brushless motor wherein a non-magnetized zone is formed on a field magnet in order to allow self-starting of the motor.
Figure 7A:
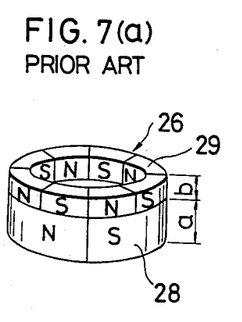
FIGS. 7(a) and 7(b) are schematic illustrations a field magnet and a stator armature core, respectively, of a conventional cored single-phase brushless motor wherein a substantially non-magnetized zone is formed on the field magnet in order to allow self-starting of the motor.
Figure 7B:
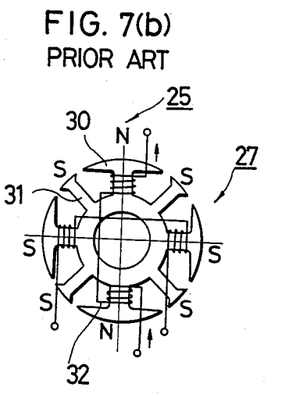

The single-phase brushless motor generally denoted at 24 in FIG. 6 (a brushless motor of the type may sometimes be called a two phase brushless motor but is properly called a single-phase brushless motor because of its energizing method; this also applies to a brushless motor shown in FIG. 7) is constituted as an inner rotor motor and includes auxiliary stator poles.

A stator armature core 19 has 4 radially extending main stator poles 20 formed in a circumferentially equidistantly spaced relationship, 4 armature coils 21 wound on the main stator poles 20, and 4 smaller auxiliary stator poles 22 formed between the main stator poles 20.

A field magnet 23 is opposed to the stator armature core 19 and has a pair of N pole zones, S pole zones and O pole (non-magnetized) zones successively formed thereon and each having an angular width equal to an electrical angle of 120 degrees.

The single-phase brushless motor 24 shown in FIG. 6 is very useful but has such a drawback as described above due to the presence of the non-magnetized zone.

A single-phase brushless motor in which a substantially non-magnetized zone is formed on a field magnet is shown in FIGS. 7(a) and 7(b).

The single-phase brushless motor generally denoted at 25 is constituted as an outer rotor motor wherein a field magnet 26 as shown in FIG. 7(a) rotors around a stator armature core 27 as shown in FIG. 7(b).

Referring to FIG. 7(a), the field magnet 26 has four driving alternate N and S magnetic pole zones 28 formed by magnetization in a circumferentially equidistantly spaced relationship from each other and eight auxiliary alternate N and S magnetic pole zones 29 also formed by magnetization in a circumferentially equidistantly spaced relationship from each other. Thus, the ratio a:b in width between the driving magnetic pole zones 28 and the auxiliary magnetic pole zones 29 is 2:1, with each of the 4 driving magnetic pole zones 28 overlapping two of the 8 auxiliary magnetic pole zones 29.

Referring now to the FIG. 7(b), the stator armature core 27 has 4 main stator poles 30 and 4 auxiliary stator poles 31 located between the stator poles 30 as in the single-phase brushless motor 24 shown in FIG. 6 (while there is a difference in that the motor 24 of FIG. 6 is constituted as an inner rotor motor and the motor 25 of FIGS. 7(a) and 7(b) is constituted as an outer rotor motor). Armature coils 32 are wound only on the main stator poles 30 and are connected into two phase windings, such that each two opposing ones thereof which are located at symmetrical positions spaced by an angle of 180 degrees relative to the center of the motor 25 are conneted in series, so as to provide a same polarity to the associated main stator poles 30.

A position detecting element such as a Hall effect element is provided at a location not shown for detecting the position of the field magnet 26, in order that the field current of the armature coils 32 is switched by means of a transistor in response to a relative position of the field magnet 26 to the stator armature core 27, to obtain a torque in a predetermined fixed direction.

The single-phase brushless motor 25 having such a construction as described above thus eliminates dead points by the combination of the composite field magnet 26 and the auxiliary stator poles 31. Meanwhile, the torque is generated by the composition of the 4 driving magnetic pole zones 28 and the 8 axuiliary magnetic pole zones 29.

The single-phase brushless motor 25 having such a construction as described above necessitates only one position detecting element an can be reduced in number of circuit components and in size of circuit if it is driven in half-waves. Thus, the single-phase brushless motor of the type is effective in practical use.

However, the single-phase brushless motor 25 also has a drawback similar to that of the single-phase brushless motor 24 described above because the auxiliary magnetic pole zones 29 and substantially non-magnetized zones are formed.

Further, the single-phase brushless motors 24, 25 which include such non-magnetized zones or substantially non-magnetized zones have another drawback, in that their structure is complicated so that they cannot be mass produced and their production cost is high because the field magnets 23, 26 are complicated and the auxiliary stator poles 19, 31 must be formed in order to allow self-starting of the motors 24, 25.

In addition, due to the presence of the auxiliary stator poles 19, 31, it is difficult to wind the armature coils 21, 32 around the main stator poles 20, 30, which makes mass production of motors of this type even more difficult.

It is to be noted that, of the single-phase brushless motors 1, 1', 2, 24, 25 described above, the motors 1, 1' of the coreless type are advantageous in that they have a relatively small number of parts, can be flattened in an axial direction and can be mass produced in a mass at a low cost, but they have a drawback that a high torque cannot be obtained.

On the other hand, the cored single-phase brushless motors 2, 24, 25 have drawbacks that they have a relatively large number of parts and hence their production cost is high and they cannot be flattened in an axial direction, but they are advantageous in that a high torque can be obtained.

Whether a single-phase brushless motor should be of the coreless structure or of the cored structure depends upon an application of the motor and such advantages and drawbacks of motors of the individuals types. Here, where a high torque is required, preferably a single-phase brushless motor of the cored type is used.

However, except single-phase brushless motors of the coreless structure, conventional single-phase brushless motors of the cored type generally have a drawback that the structure is complicated and hence their production cost is high.

SUMMARY OF THE INVENTION

It is an object of the present invention to provide a single-phase brushless motor of the cored type which generates little or substantially no cogging torque and can be rotated smoothly with minimized torque ripples.

It is another object of the invention to provide a single-phase brushless motor of the cored type which can start itself without utilizing a cogging torque and can be produced at a low cost with a simplified construction.

It is a further object of the invention to provide a single-phase brushless motor of the cored type in which a high torque can be generated uniformly over an entire rotation with a high efficiency.

In order to attain the objects, according to the present invention, there is provided a cored single-phase brushless motor of the type which includes a field magnet as a rotor having 2P (P is an integer equal to or greater than 1) driving alternate north and south magnetic pole zones and a stator armature core disposed in an opposing relationship to said field magnet, with an air gap left therebetween and having a plurality of armature coils would thereon. Either the north pole zone or zones or the south pole zone or zones of said driving field magnet have an angular width equal to an electrical angle of 120 or about 120 degrees while the other pole zone or zones have an angular width equal to an electrical angle of 240 or about 240 degrees. The stator armature core has 3n (n is an integer equal to or greater than 1) equidistantly spaced stator poles having an angular width equal to an electrical angle of 120 or about 120 degrees the armature coils include first n armature coils for the phase A wound on one or those of said stator poles which are formed at a position or positions of an electrical angle of m·360·a (m is an integer equal to or greater than 0 and a is an integer equal to or greater than 1) or about m·360·a degrees, second n armature coils for the phase B wound on one or those of said stator poles which are formed at a position or positions circumferentially spaced by an electrical angle of n·(360·b−240) (b is an integer equal to or greater than 1) or about n·(360·b−240) degrees from the stator pole or poles on which said armature coil or coils for the phase A are wound, and third n armature coils for the phase C wound on the remaining one or ones of said stator poles which are formed at a position or positions circumferentially spaced by an electrical angle of n·(360·c−240) (c is an integer equal to or greater than 1) or about n·(360·c−240) degrees from the stator pole or poles on which said armature coil or coils for the phase A are wound the brushless motor comprising an electric circuit for successively energizing the n armature coils for the phase A, the n armature coils for the phase B and the n armature coils for the phase C for an electrical angle of 120 or about 120 degrees.

Thus, according to the present invention, a cored single-phase brushless motor which can start itself and can generate a high torque can be attained without the necessity of provision of a special cogging torque generating means only by magnetizing a field magnet such that either an N pole zone or zones or an S pole zone or zones thereof have an angular width twice of that of the other S or N pole zone or zones.

DESCRIPTION OF THE PREFERRED EMBODIMENTS

Figure 8:
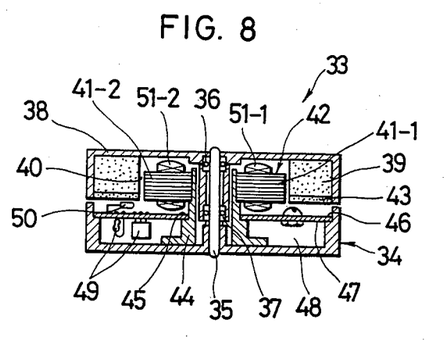
FIG. 8 is a vertical sectional view of a cored single-phase brushless motor according to an embodiment of the present invention.

Referring first to FIG. 8, there is illustrated a cup-shaped, single-phase brushless motor of the cored and radial air gap type according to a first embodiment of the present invention. Throughout this discussion, the term "cored" refers to a motor having a core, as opposed to a "coreless" motor without a core. The single-phase brushless motor generally denoted at 33 includes a cup-shaped motor body 34 made of a soft steel plate and forming a stationary section. A rotary shaft 35 is supported for rotation at a substantially central portion of the motor body 34 by means of a pair of bearings 36, 37.

A cup-shaped rotor yoke 38 is secured to the rotary shaft 35. A cylindrical 2-pole field magnet 39 is secured to an inner circumferential face of the rotor yoke 38, while a stator armature core 42 is securely supported on a support stator 44 secured to the motor body 34. The stator armature core 42 has three T-shaped stator poles 41-1, 41-2, 41-3 extending radially from an annular central interconnecting portion 42a and circumferentially spaced by an electrical angle of 120 degrees (or about 120 degrees, same in mechanical angle) from each other as seen from FIG. 9. An air gap 40 is defined between an inner circumferential face of the field magnet 39 and outer faces of the T-shaped stator poles 41-1, 41-2, 41-3 of the stator armature core 42, and armature coils 51-1, 51-2, 51-3 are wound on the stator poles 41-1, 41-2, 41-3, respectively.

Figure 10:
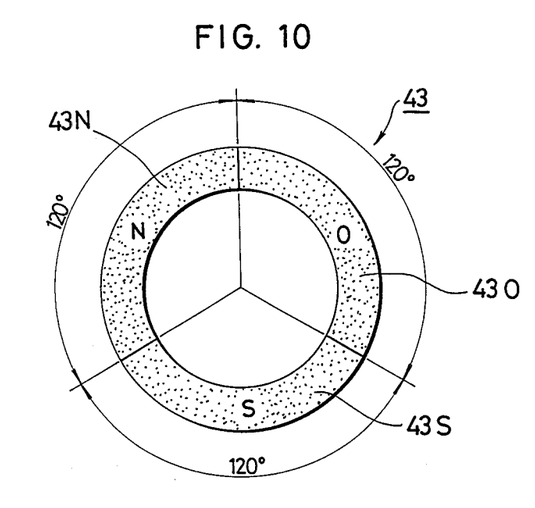
FIG. 10 is bottom plan view, in a further enlarged scale, of a position detecting magnet rotor of the motor of FIG. 8.

An axially magnetized 3-pole position-detecting magnet rotor 43 is formed at, for example, by application to, a lower end of the field magnet 39. The position-detecting magnet rotor 43 has an N pole zone 43N, an S pole zone 43S and an O pole (non-magnetized) zone 43O each having an angular width equal to an electrical angle of approximately 120 degrees (same in mechanical angle) as illustratively shown in FIG. 10.

It is to be noted that while in FIG. 8 the position-detecting magnet roller 43 is shown applied directly to a lower end face of the driving field magnet 39, it may otherwise be applied thereto with a yoke interposed therebetween or alternatively it may be formed by axially magnetizing a lower end portion of the driving field magnet 43.

A printed circuit board 47 on which a printed wiring pattern not shown is formed is securely supported in a horizontal position by an engaging shoulder 45 formed on the support stator 44 and another engaging shoulder 46 formed on the motor body 34. Thus, an electric part accommodating spacing 48 is formed between the printed circuit board 47 and the bottom of the motor body 34.

Electric parts 49 constituting an electric circuit are located on a lower face of the printed circuit board 47 within the electric part accommodating spacing 48.

A position detecting element 50 constituted by a magnetic sensor such as a Hall effect element or a Hall IC for detecting a magnetic pole of the position detecting-magnet rotor 43 is located on an upper face of the printed circuit board 47 opposing the position detecting magnet rotor 43.

Figure 9:
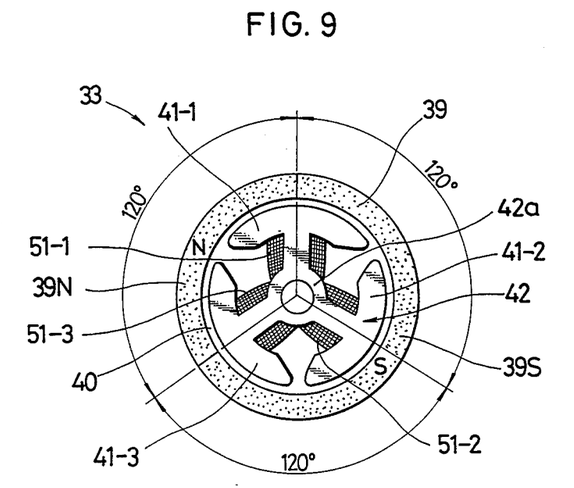
FIG. 9 is a transverse sectional view, in a somewhat enlarged scale, of the single-phase brushless motor of FIG. 8.

FIG. 9 is a transverse sectional view of the cup-shaped, cored single-phase brushless motor 33 of the radial air gap type including the 2-pole field magnet 39 and the stator armature core 42 having the 3 radially extending stator poles.

Referring to FIG. 9, the 2-pole field magnet 39 is magnetized in a radial direction and has an N pole zone 39N having an angular width equal to an electrical angle of approximately 120 degrees (same in mechanical angle) and an S pole zone 39S having a width equal to an electrical angle of approximately 240 degrees (same in mechanical angle). Thus, the ratio in width between the N and S pole zones (39N, 39S is about 1:2.

The stator armature core 42 has a total of 3n T-shaped stator poles equidistantly spaced from each other in a circumferential direction and each having an angular width equal to an electrical angle of approximately 120 degrees. Here in the present embodiment, n=1 is selected, and accordingly the stator armature core 42 has 3 T-shaped stator poles 41-1, 41-2, 41-3 each having a width of an electrical angle of approximately 120 degrees (same in mechanical angle).

The T-shaped stator pole 41-1 is formed at a position of an electrical angle of m·360·a degrees (where m is an integer equal to or greater than 0, and a is an integer equal to or greater than 1; in the present embodiment, m=1 and a=1 are selected). The armature coil 51-1 for the phase A is wound on the stator pole 41-1.

At a position circumferentially spaced by an electrical angle of approximately n·(360·b−240) degrees (where n and b are each an integer equal to or greater than 1; in the present embodiment, n=1 and b=1 are selected), that is, by an electrical angle of approximately 120 degrees, from the position of the stator pole 41-1, the second stator pole 41-2 is formed. The armature coil 51-2 for the phase B is wound on the stator pole 41-2.

The third stator pole 41-3 is formed at a position circumferentially spaced by an electrical angle of approximately n·(360·c−240) degrees (where c is an integer equal to or greater than 1; in the present embodiment, c=1 is selected), that is, by an electrical angle of approximately 240 degrees, from the position of the stator pole 41-1. The armature coil 51-3 for the phase C is wound on the stator pole 41-3.

It is to be noted that, while the stator poles 41-1, 41-2, 41-3 do not in fact include an angular width of an electrical angle of 120 degrees, they are formed with a width equivalent to an electrical angle of 120 degrees because almost all magnetic flux passes the stator poles 41-1, 41-2, 41-3 and thus little magnetic flux passes an air gap between the adjacent stator poles.

Figure 11A:
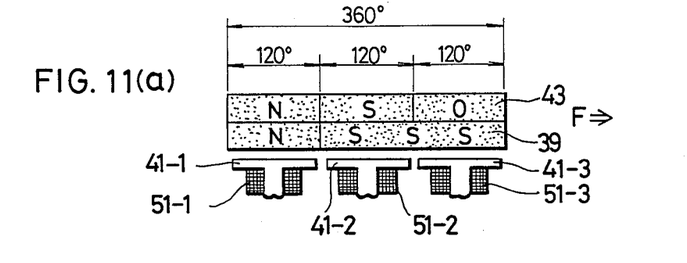
FIGS. 11(a) and 11(b) are developed views of a field magnet and a stator armature core of the motor of FIG. 8, and FIGS. 11(c) to 11(f) are diagrams illustrating a principle of generation of torque in the motor.
Figure 11B:
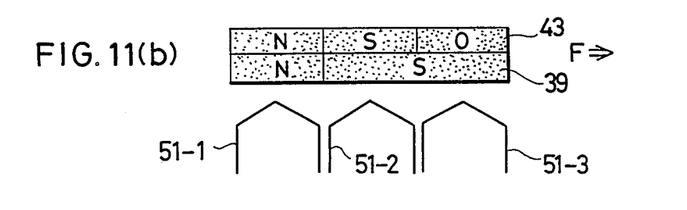

Developed views of the single-phase brushless motor 33 are shown in FIGS. 11(a) and 11(b), while a principle of generation of a torque is illustrated in FIGS. 11(c) to 11(f) in which the ordinate represents the torque T and the abscissa represents the angular rotor displacement ω and the electrical angle θ.

Figure 11C:
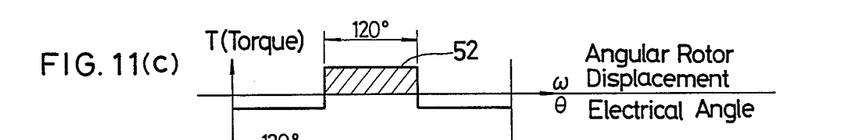

Referring to FIGS. 11(a) to 11(f), as the armature coil 51-1 is energized, the field magnet 39 is moved in a direction indicated by an arrow mark F and thus a torque curve 52 as shown in FIG. 11(c) is obtained by the armature coil 51-1.

Thus, a torque is obtained over an electrical angle of 120 degrees as shown by a hatched portion of the torque curve 52. Accordingly, the single-phase brushless motor 33 is rotated by an electrical angle of 120 degrees.

Figure 11D:
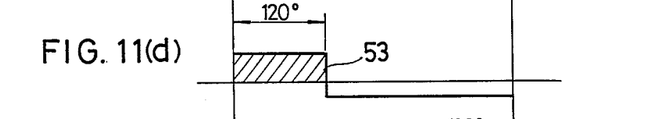

Then, as the second armature coil 51-2 is energized, the field magnet 39 is moved in the direction of the arrow mark F and a torque curve 53 as shown in FIG. 11(d) is obtained by the armature coil 51-2.

Thus, a torque is obtained over an electrical angle of 120 degrees, as shown by a hatched portion of the torque curve 53. Accordingly, the single-phase brushless motor 33 is further rotated by an electrical angle of 120 degrees. Consequently, the single-phase brushless motor 33 is rotated over a range of a total electrical angle of 240 degrees from its initial position by the torque of the armature coils 51-1 and 51-2.

Figure 11E:
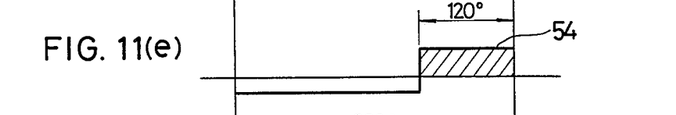

Further, as the third armature coil 51-3 is energized, the field magnet 39 is moved in the direction of the arrow mark F, and a torque curve 54 as shown in FIG. 11(e) is obtained by the armature coil 51-3.

Thus, a torque is obtained over an electrical angle of 120 degrees, as shown by a hatched portion of the torque curve 54. Accordingly, the single-phase brushless motor 33 is further rotated by an electrical angle of 120 degrees.

Accordingly, the single-phase brushless motor 33 is rotated over a total electrical angle of 360 degrees by the torque generated by the armature coils 51-1, 51-2 and 51-3.

Figure 11F:
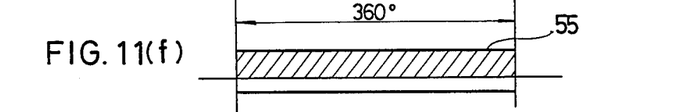

In other words, by combining the torque curves 52, 53 and 54, a composite torque curve 55 as shown in FIG. 11(f) is obtained. As can be seen from a hatched portion of the composite torque curve 55 of FIG. 11(f), a uniform, substantially fixed torque in a forward direction can be obtained over a range of an electrical angle of 360 degrees for each rotation.

Accordingly, since a torque can be obtained over a range of an electrical angle of 360 degrees with generally low torque ripples, the motor can start itself without a special self-starting means (a cogging torque generating means) (naturally this may be additionally provided) and can produce a high turning torque.

Thus, a smooth torque over a range of an electrical angle of 360 degrees can be obtained on the cored single-phase brushless motor 33 having the single position detecting element 50. Accordingly, the single-phase brushless motor 33 can start itself and can rotate one full rotation, and hence can continue its rotation.

Figure 12:
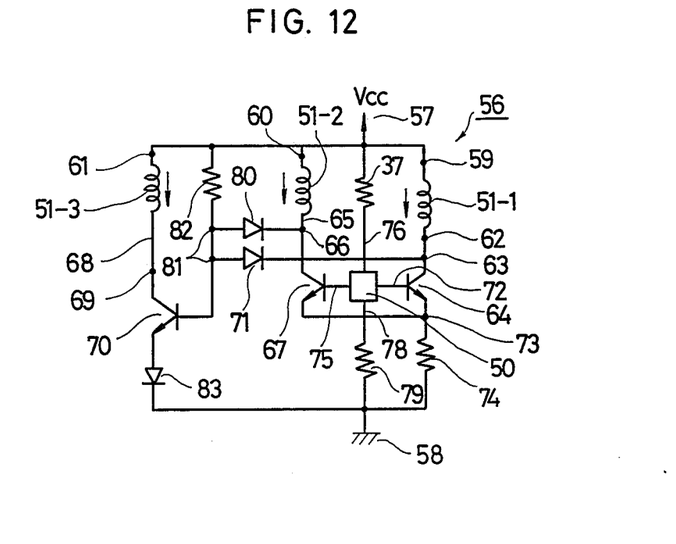
FIG. 12 is a circuit diagram of an energization controlling circuit employed in the motor of FIG. 8.

FIG. 12 shows an example of energization controlling circuit 56 which can be applied to the single-phase brushless motor according to the present invention. Referring to FIG. 12, the energization controlling circuit 56 is connected between a positive power supply 57 and the ground 58. Terminals 59, 60 and 61 of the energization controlling circuit 56 are connected in common to the positive power supply 57.

The terminal 59 is connected to an end of the armature coil 51-1 for the phase A, the terminal 60 to an end of the armature coil 51-2 for the phase B, and the terminal 61 to an end of the armature coil 51-3 for the phase C.

The other terminal 62 of the armature coil 51-1 is connected to the collector of a transistor 64 via a terminal 63. The other terminal 65 of the armature coil 51-2 is connected to the collector of another transistor 67 via a terminal 66. The other terminal 68 of the armature coil 51-3 is connected to the collector of a further transistor 70 via a terminal 69.

The terminal 63 for connection between the collector of the transistor 64 and the terminal 62 is connected to the cathode of a diode 71. The base of the transistor 64 is connected to an output terminal 72 of the Hall effect element 50 employed as a position detecting element. The emitters of the transistors 64 and 67 are connected in common at a terminal 73 and to the ground 58 via an emitter resistor 74. The other output terminal 75 of the Hall effect element 50 is connected to the base of the transistor 67.

A positive power terminal 76 of the Hall effect element 50 is connected to the positive power supply 57 via a resistor 77, and a negative power terminal 78 is connected to the ground 58 via a resistor 79. The base of the transistor 70 is connected to the positive power supply 57 via a function point 81 between the anodes of the diodes 71 and 80 and via a resistor 82. The cathode of the diode 80 is connected to the connecting point 66. The emitter of the transistor 70 is connected to the anode of the diode 83. The cathode of the diode 83 is connected to the ground 58.

The energization controlling circuit 56 has such a construction as described above. Accordingly, where the Hall effect element 50 is located at a same phase position with the armature coil 51-1 for the phase A, if the Hall effect element 50 detects the N pole zone 43N of the position detecting magnet rotor 43 upon starting of rotation of the field magnet 39 relative to the stator armature core 42, the transistor 64 is rendered conductive in response to a signal delivered thereto via the output terminal 72 of the Hall effect element 50. As a result, electric current will flow in a direction shown by an appended arrow mark in FIG. 12, so that a turning torque for the phase A will be generated over a range of an electrical angle of 120 degrees as seen from the timing chart of FIG. 11(c) from the angular position of a·360·m degrees in accordance with the Fleming's left-hand rule (in the case of a cored motor, explanation cannot be given completely by this, but this can be almost justifiable).

Accordingly, the field magnet 39 will be rotated over a range of an electrical angle of 120 degrees in the direction of the arrow mark F.

After rotation of the field magnet 39 by an electrical angle of 120 degrees, the Hall effect element 50 will now detect the S pole zone 43S of the position-detecting magnet rotor 43. Consequently, the Hall effect element 50 now delivers an output signal from its output terminal 75 to render the transistor 67 conductive. As a result, the armature coil 51-2 is energized by electric current flow in a direction of an appended arrow mark so that a turning torque for the phase B will be generated in the predetermined direction over a range of an electrical angle of 120 degrees as seen from the timing chart of FIG. 11(d) from the angular position of n·(360·b−240) degrees by the armature coil 51-2 located at the angular position in accordance with the Fleming's left-hand rule in a similar manner as described above.

Thus, the turning torque for the phase B provides a total turning torque over a range of an electrical angle of 240 degrees together with the turning torque for the phase B, and hence the field magnet 39 is rotated over a range of an electrical angle of 240 degrees from its initial position.

After rotation of the field magnet 39 by a total electrical angle of 240 degrees, the Hall effect element 50 will now detect the O pole (non-magnetized) zone 43O of the position detecting magnet rotor 43. Consequently, the Hall effect element 50 will now provide no output signal from the output terminals 63, 75 so that neither of the armature coils 51-1, 51-2 is energized and hence no torque is generated thereby.

In this instance, however, since the potential at the junction point 81 is at a high level, that is, the high voltage of the positive power supply 57 is applied to the base of the transistor 70 via the resistor 82, the transistor 70 is rendered conductive so that electric current will flow in a direction of an appended arrow mark through the armature coil 51-3. Consequently, a turning torque for the phase C will be generated in the direction over a range of an electrical angle of 120 degrees as seen from the timing chart of FIG. 1(e) from the angular position of n·(360·c−120) degrees by the armature coil 51-3 located at the angular position in accordance with the Fleming's left-hand rule in a similar manner as described above.

Thus, as seen from the timing chart of FIG. 11(f), the turning torque for the phase C provides a turning torque over an electrical angle of 360 degrees together with the turning torque for the phases A and B. Accordingly, the field magnet 39 is rotated over a range of a total electrical angle of 360 degrees.

Since the initial stage is reached upon completion of the rotation of the field magnet 39 by the torque for the phase C, the field magnet 39 will be thereafter rotated continuously in a same manner.

It is to be noted that if constants of the resistors in the circuit 56 are selected suitably, even if the position detecting element (Hall effect element) 50 detects a boundary between the N pole zone 43N and the S pole zone 43S or between the N pole zone 43N or the S pole zone 43S and the O pole (non-magnetized) zone 43O while the single-phase brushless motor 33 is in a stopped condition, the circuit 56 can operate normally to start the single-phase brushless motor 33.

Figure 13:
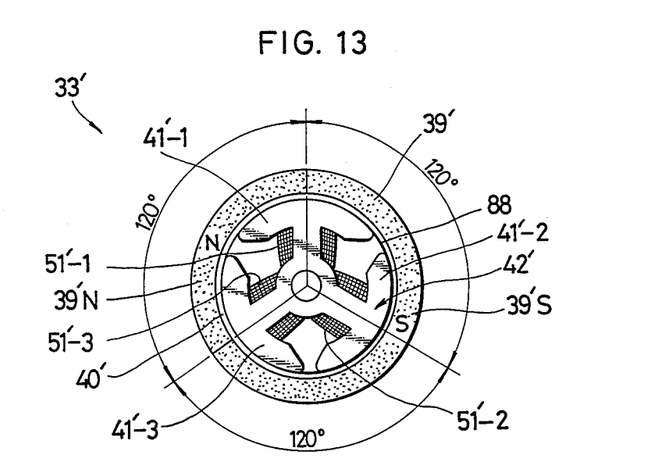
FIG. 13 is a transverse sectional view of a cored single-phase brushless motor according to another embodiment of the invention.

Referring now to FIG. 13, there is illustrated a cored single-phase brushless motor 33' according to a second embodiment of the invention. The cored single-phase brushless motor generally denoted at 33' has a similar construction as the cored single-phase brushless motor according to the first embodiment described above, and hence description will be given only of a difference between the two brushless motors. The cored single-phase brushless motor 33' additionally includes a magnetic member 88 in the form of a ring having a small radial thickness and secured to a stator armature core 42' by a suitable means such that it may oppose a field magnet 39' with a radial air gap 40' left therebetween.

Provision of the magnetic member 88 in the form of a ring will almost eliminate generation of a cogging torque having a bad influence on rotation of the field magnet 39' in spite of the presence of the stator poles 41-1, 41-2, 41-3, or if the magnetic member 88 is designed suitably, a cored single-phase brushless motor which generates no cogging torque can be obtained.

It is to be noted here that, while the embodiments described above include the 2-pole field magnet 39, 39' and the stator armature core 42, 42' having the 3 stator poles 41-1, 41-2, 41-3, 41'-1, 41'-2, 41'-3 and the 3 armature coils 51-1, 51-2, 51-3, 51'-1, 51'-2, 51'-3 wound on the stator poles, respectively, the present invention is not limited to the motors of such construction. Also, a field magnet having 2P (P is an integer equal to or greater than 2) magnetic pole zones may be used while the number of the stator poles is not limited to 3 and thus 3n (n is an integer equal to or greater than 2) stator poles may also be provided for a stator armature core. Further, 3n (n is an integer equal to or greater than 1) armature coils may be wound on 3n (n is an integer equal to or greater than 2) stator poles.

Figure 14:
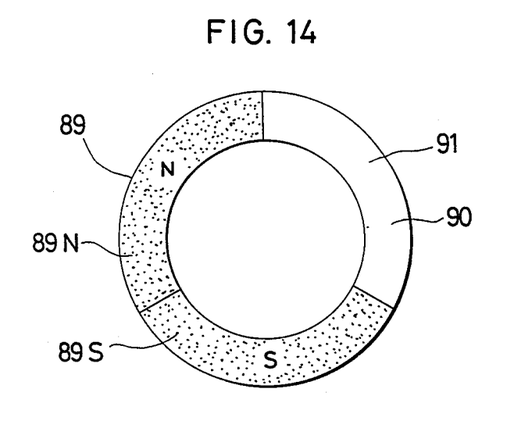
FIGS. 14 to 16 are bottom plan views of position detecting magnet rotors in modified forms.

Meanwhile, a non-magnetized zone can be formed on a position detecting magnet rotor in a different manner from the O pole (non-magnetized) zone described above. An example is illustrated in FIG. 14. Referring to FIG. 14, a rotor yoke 91 in the form of a ring is secured to a lower end of a field magnet not shown, and an N pole zone 89N is formed in a range of an electrical angle of 120 degrees and an S pole zone 89S is formed in a contiguous range of an electrical angle of 120 degrees of the rotor yoke 91 while a portion of the rotor yoke 91 over the remaining range of an electrical angle of 120 degrees is, for example, cut away to form a removed portion 91 which constitutes a non-magnetized zone corresponding to the non-magnetized zone 43O.

Figures 15, 16:
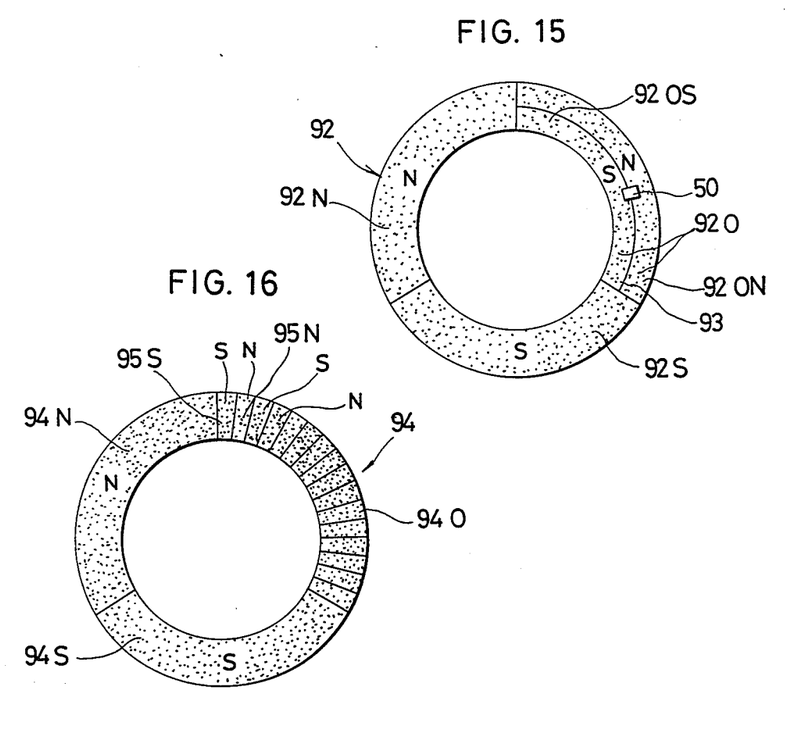

Alternatively, a position detecting magnet rotor as shown in FIG. 15 may be used. The position detecting magnet rotor 92 of FIG. 15 has an N pole zone 92N and an S pole zone 92S formed in contiguous ranges thereof each extending over an electrical angle of 120 degrees and a substantially non-magnetized zone 92O formed over the remaining range thereof extending over an electrical angle of 120 degrees corresponding to the non-magnetized zone 43O described above.

The substantially non-magnetized zone 92O can be formed by forming an N pole zone 92ON and an S pole zone 92OS in a circumferentially parallel relationship with a suitable radial width over the remaining range by a suitable method.

The substantially non-magnetized zone 92O shown in FIG. 15 is formed by magnetizing an outer half of the magnet rotor 92 into the N pole zone 92ON and an inner half into the S pole zone 92OS.

The substantially non-magnetized zone 92O acts as such because the N pole zone 92ON and the S pole zone 92OS act to cancel each other.

In this instance, a position detecting element 50 need be located such that it may oppose boundary 93 between the N pole zone 92ON and the S pole zone 92OS.

A different position detecting magnet rotor as shown in FIG. 16 may alternatively be used. The position detecting magnet rotor 94 shown in FIG. 16 has an N pole zone 94N and an S pole zone 94S formed in contiguous ranges thereof each extending over an electrical angle of 120 degrees and a substantially non-magnetized zone 94O formed in the remaining range thereof extending over an electrical angle of 120 degrees corresponding to the non-magnetized zone 43O described above.

The substantially non-magnetized zone 94O is formed by magnetizing the remaining range of the position detecting magnet rotor 94 to form alternate N pole zones 95ON and S pole zones 95OS in a fine pitch.

It is to be noted that, while in the embodiments described above any of the position detecting magnet rotors is formed at the lower end of the field magnet, it can be formed at any other location.

It is also to be noted that, while all of the embodiments described hereinabove are of an outer rotor structure, the present invention can naturally be applied to cored single-phase brushless motors of an inner rotor structure or of a structure having an axial air gap.

What is claimed is:

1. In a cored single-phase brushless motor of the type which includes a field magnet as a rotor having 2P (P is an integer equal to or greater than 1) driving alternate north and south magnetic pole zones, and a stator armature core disposed in an opposing relationship to said field magnet with an air gap left therebetween and having a plurality of armature coils wound thereon, the improvement wherein either the north pole zones or the south pole zones of said driving field magnet have an angular width equal to an electrical angle of about 120 degrees while the other pole zones have an angular width equal to an electrical angle of about 240 degrees, and said stator armature core has 3n (n is an integer equal to or greater than 1) equidistantly spaced stator poles having an angular width equal to an electrical angle of about 120 degrees, said armature coils including first n armature coils for the phase A wound on one or those of said stator poles which are formed at a position or positions of an electrical angle of about m·360·a (m is an integer equal to or greater than 0 and a is an integer equal to or greater than 1) degrees, second n armature coils for the phase B wound on one or those of said stator poles which are formed at a position or positions circumferentially spaced by an electrical angle of about n·(360·b−240) (b is an integer equal to or greater than 1) degrees from the stator pole or poles on which said armature coil or coils for the phase A are wound, and third n armature coils for the phase C wound on the remaining one or ones of said stator poles which are formed at a position or positions circumferentially spaced by an electrical angle of about n·(360·c−240) (c is an integer equal to or greater than 1) degrees from the stator pole or poles on which said armature coil or coils for the phase A are wound, said brushless motor comprising an electric circuit for successively energizing the n armature coils for the phase A, the n armature coils for the phase B and the n armature coils for the phase C for an electrical angle of 120 or about 120 degrees.

2. A cored single-phase brushless motor according to claim 1, further comprising a position detecting magnet rotor having 3P successive north and south magnetic pole and non-magnetized zones having an angular width equal to an electrical angle of about 120 degrees, and a single magnetic sensor for detecting a magnetic pole of said position detecting magnet rotor, and wherein said electric circuit operates such that when said magnetic sensor detects a north pole of said position detecting magnet rotor, the n armature coil or coils for the phase A are energized over a range of an electrical angle of about 120 degrees, and when said magnetic sensor detects a south pole of said position detecting magnet rotor, the n armature coil or coils for the phase B are energized over a range of an electrical angle of about 120 degrees, but when said magnetic sensor detects a non-magnetized pole of said position detecting magnet rotor and develops no output therefrom, the n armature coil or coils for the phase C are automatically energized over a range of an electrical angle of about 120 degrees.

3. A cored single-phase brushless motor according to claim 2, wherein said position detecting magnet rotor is formed by magnetizing part of said field magnet on which the driving magnetic poles are formed.

4. A cored single-phase brushless motor according to claim 2, wherein said position detecting magnet rotor is formed by axially magnetizing an end of said field magnet on which the driving magnetic poles are formed annularly.

5. A cored single-phase brushless motor according to claim 1, wherein said brushless motor is of the axial air gap type, and said stator armature core has a magnetic member in the form of a ring of a radially small thickness secured to a face thereof opposing to said field magnet with said air gap left therebetween.

* * * * *